(12) United States Patent
Faibish et al.

(10) Patent No.: US 8,429,307 B1
(45) Date of Patent: Apr. 23, 2013

(54) APPLICATION AWARE INTELLIGENT STORAGE SYSTEM

(75) Inventors: Sorin Faibish, Newton, MA (US); Philippe Armangau, Acton, MA (US); Christopher Seibel, Walpole, MA (US)

(73) Assignee: EMC Corporation, Hopkinton, MA (US)

( * ) Notice: Subject to any disclaimer, the term of this patent is extended or adjusted under 35 U.S.C. 154(b) by 381 days.

(21) Appl. No.: 12/826,749

(22) Filed: Jun. 30, 2010

Related U.S. Application Data

(60) Provisional application No. 61/329,741, filed on Apr. 30, 2010.

(51) Int. Cl.
*G06F 3/00* (2006.01)

(52) U.S. Cl.
USPC ............... 710/5; 710/1; 710/3; 710/4; 710/7; 710/15; 710/20; 710/22; 710/33

(58) Field of Classification Search ............... 710/1, 3, 710/4, 5, 7, 15, 20, 22, 33
See application file for complete search history.

(56) References Cited

U.S. PATENT DOCUMENTS

| | | | |
|---|---|---|---|
| 5,890,014 A * | 3/1999 | Long | 710/8 |
| 6,609,210 B1 * | 8/2003 | Onuma | 713/323 |
| 7,822,731 B1 * | 10/2010 | Yu et al. | 707/705 |
| 8,266,136 B1 * | 9/2012 | Pogde et al. | 707/711 |
| 8,266,388 B2 * | 9/2012 | Furtek et al. | 711/149 |

\* cited by examiner

*Primary Examiner* — Idriss N Alrobaye
*Assistant Examiner* — Jasjit Vidwan
(74) *Attorney, Agent, or Firm* — Krishnendu Gupta; Joseph D'Angelo

(57) ABSTRACT

This invention is a system and a method for operating a storage server that provides read or write access to a data in a data network using a new architecture. The method of processing I/Os in response to a request by a client of the storage server executes one or more services communicated by a policy engine. The I/Os received from the application are tagged and catalogued to create co-related I/O patterns. The policy engine is then updated with the results of processing the I/Os after executing services on those I/Os.

23 Claims, 10 Drawing Sheets

APPLICATION AWARE INTELLIGENT STORAGE SYSTEM

This application claims the benefit of priority of U.S. Patent Application Ser. No. 61/329,741 entitled "Application Aware Intelligent Storage" filed Apr. 30, 2010 which is incorporated herein by reference for all purposes.

FIELD OF THE INVENTION

This invention relates generally to accessing disk storage in a data storage environment, and more particularly to a system and a method for using application aware intelligent storage.

BACKGROUND OF THE INVENTION

Storage has become a commodity component in any computing environment and storage arrays are pushed down the stack of value offered to data centers. Intelligent storage arrays have large caches as well as high computing power that can be used in an intelligent way to add value. Today, the computing power of the storage arrays and cache are used for low intelligent tasks such as caching I/Os for speed before flushing them to disk, protecting data, RAID computations, pre-fetching I/Os for increased read performance, thin provisioning, replication and mirroring. These do not use any machine learning or artificial intelligence. In fact they are mainly control and management of the I/O subsystem. All the higher intelligent tasks are left to applications outside the array.

Application users require suitable performance for access to the storage system and do not care of the storage type. Users are not necessarily aware of the energy consumption or cost of the storage service. Therefore, users need ease of use of the storage without having to know storage configuration or price tag and provisioning. They need to be sure the data they use is protected and do not care what protection technology is used. Users need the data to be stored in secure storage and take no notice about how the data is encrypted and managed. Users only need to see a cloud storage that satisfies all the above criteria without worrying about how these goals are achieved. IT needs to supply the right amount of storage such that applications are not disturbed by shortage. In addition, IT must fulfill this correct storage requirement to deliver the best performance at lowest possible cost. IT deploys tiered storage to achieve the SLAs committed to the business at expense of human resources. IT must ensure full data protection and disaster recovery crucial to the business at expense of complexity. Finally, they must ensure maximum data security and safety specific to each part of the business and application.

As businesses try to address the cost/performance storage as well as energy savings, they are turning to tiered storage and disks that have been powered off, leaving IT to manage the complexity and ensure SLAs to users. Storage arrays use tiered storage to achieve the SLAs committed to the business at the expense of IT resources. There is a need to ensure full data protection and disaster recovery that is crucial to the business. Users need a storage system that is able to accommodate any type of application workloads transparently. Users require a storage system that will deliver optimal performance to all the applications concurrently maximizing the value of all the storage resources. A storage system is needed that will send feedback to IT with recommendations for additional resources required to fulfill all the SLAs of all applications and automatically rebalance storage resources based on changes in application mix. Vendors also need this storage system to utilize optimally new resources added to it. The highly artificial intelligent storage system is able to meet all these aforementioned needs.

SUMMARY OF THE INVENTION

To overcome the problems described above and to provide the advantages also described above, the present invention in one embodiment includes a method for operating a storage server in a data network for read or write access to data of a file. The file includes multiple data blocks containing data of the file, and the file is organized as a hierarchy of file system blocks including Modes, indirect blocks, and data blocks. The file is stored in a data storage that includes a production file having a first data block in the hierarchy of file system blocks, the first data block being a child of the production file mode in the hierarchy of file system blocks. In response to a request by a client of the storage server to read or write data from a storage server, one or more I/Os received from an application are tagged. The tagging of one or more I/O is done based on the application sending the I/O request to the storage server and characteristics of the I/O. One or more tagged I/Os are then catalogued to create one or more co-related I/O patterns using a neural network. The neural network uses the one or more tagged I/Os to create one or more I/O pattern. I/Os are processed by performing one or more services executed by a service manager. The service manager executes one or more services communicated by a policy engine and the policy engine manages the services that are needed to be performed on one or more tagged I/Os. The policy engine is updated with the results of processing one or more I/Os by the service manager.

In another embodiment, a system for accessing data in a data storage environment includes program logic to carry out the steps of tagging one or more I/Os received from an application for read or write access to data of a file. The tagged I/Os are catalogued to create one or more co-related I/O patterns using a neural network. The I/Os are processed by performing one or more services executed by a service manager where the service manager executes one or more services communicated by a policy engine that manages the services that are needed to be performed on one or more tagged I/Os. The policy engine is updated with the results of processing one or more I/Os by the service manager.

In another embodiment, a program product includes a computer-readable medium having code included on the medium configured to carry out computer-executed steps that are similar or identical to those described above with reference to the embodiment of the method.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

Figure 1:
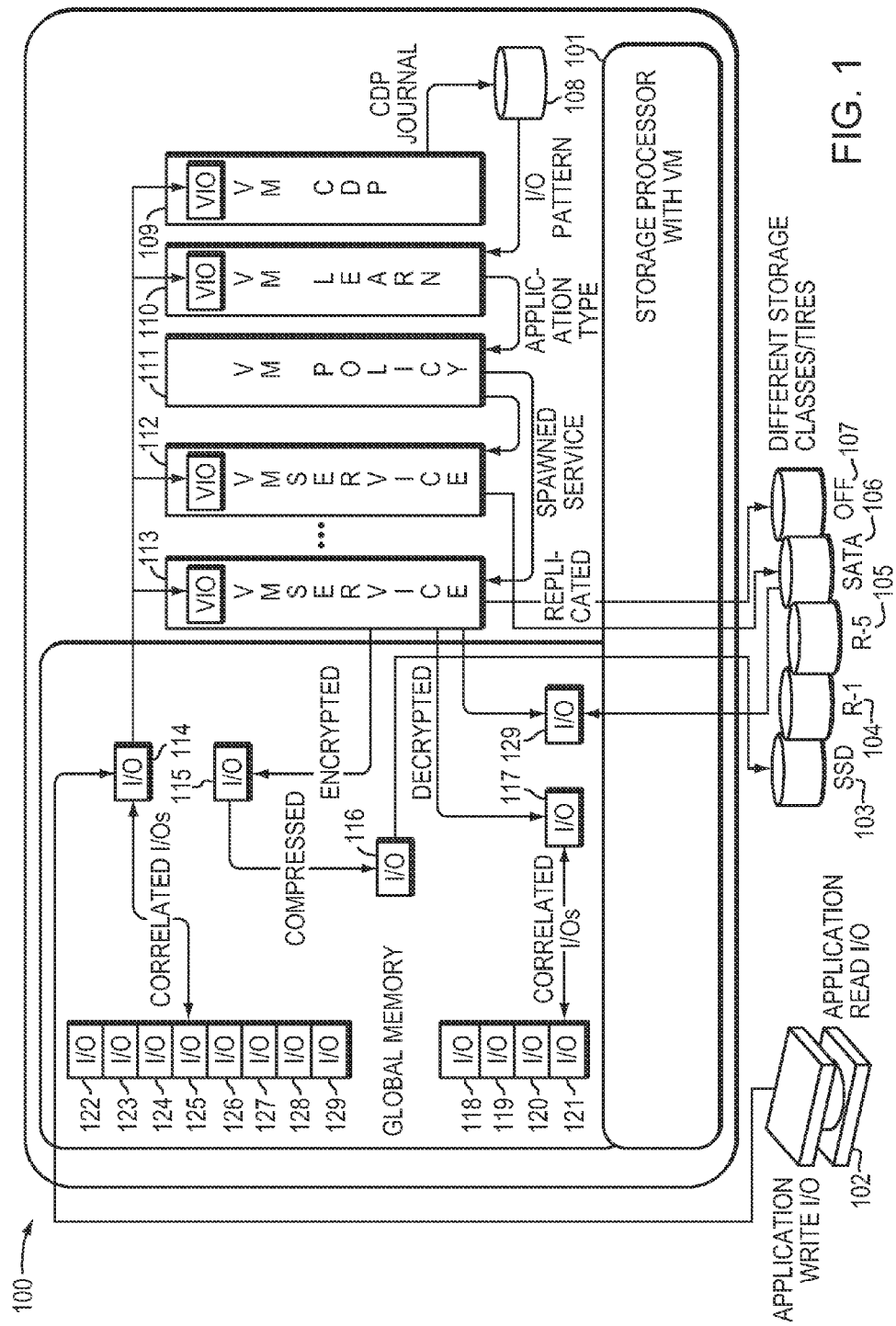
FIG. 1 is a block diagram of an application aware intelligent storage system including set of virtual memory machines, storage device, learning engine, services manager engine and a file server in accordance with the present invention.

The methods and apparatus of the present invention are intended for use in a data storage environment that include data storage systems, such as the Symmetrix Integrated Cache Disk Array system or the Clariion Disk Array system available from EMC Corporation of Hopkinton, Mass. and those provided by vendors other than EMC, and a file server such as Celerra File Server, which is available from EMC Corporation of Hopkinton, Mass.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code (software-based logic) for carrying out the method is embodied as part of the system described below.

Overview

The application aware intelligent storage system uses the additional computation power for higher intelligent tasks such as recording/indexing and cataloging all the I/Os landing in the cache, cataloging data to learn JO patterns and behaviors, and matching them with the knowledge of host applications to adaptively locate the data blocks on different storage tiers based on their characteristics. Using the higher intelligence, one can use many functions that are now implemented in servers to be migrate inside the storage array and increase their value while freeing the servers to use the computing power to services like SaaS.

With these new functions, users are now able to add storage resources based on the available budget and get maximum performance from given resources, report back to users shortage of resources required to achieve the SLOs of all applications and make recommendations for additional resources to achieve the required SLOs. It also would include reporting back to the users any changes in application behavior generating missed SLOs, deliver different SLOs for different applications which include lower SLOs for test applications than production applications sharing resources. The goal of the artificial intelligent storage system is to always use the minimal amount of energy to achieve provisioning application SLOs with minimal storage resources and to deliver highest price/performance storage value at any time. Service level agreements (SLAs) and service level objectives (SLOs) are the keys to modern policy-based storage management. Between them, they set the rules for making storage meet the business objectives of the enterprise. SLAs are, in effect, the storage administrator's promise to the rest of the enterprise. They are the standards that the IT department agrees to meet. Examples include agreements on availability and response time. SLOs are technical goals that ensure the SLAs will be met.

Using the new artificial intelligent storage systems, customers will also be able to create temporary copies of I/Os based on hot spot detections, encrypt/decrypt data blocks based on similarity of location, de-dupe and compress I/Os on the fly and place them in faster storage based on access frequency (number of copies), add new services (pre-stored VM service images) as new needs appear and store DB of less frequently used VM service providing images.

Architecture

FIG. 1 shows an application aware intelligent storage system 100 including various services engines processing the I/Os sent by application 102 running on client machines and data being read or written from various class of storage devices 103-107 like SSD, Raid-1, Raid-5 and SATA. A storage processor 101 running on virtual machine interacts with storage devices and services engine. Further, one can use VMware to run multiple virtual machines (VM) where various services use one or multiple VM depending on policy, priority and speed. VM machines will "see" all the IO traffic to and from cache and will be non-intrusive to the I/O (out-of-band) preserving pipes speeds and performance. VM machines virtualize services as well as storage access. Central Data Processing (CDP) engine 109 runs on one of the virtual machine and use CDP Journal 108 for I/O indexing and cataloging incoming and outgoing I/Os from the storage cache. Compression of the data is used to minimize storage wasted for any I/O. CDP engine 109 generates spatial and temporal IO patterns that are inputted to Learning Engine 110 running on one of the virtual machine. Replication engine in one of the VM 113 uses services used for managing multiple copies generation and synchronization where disk is remote from the cache. Learning engine 110 is trained for a given set of applications to identify the application specific I/O access pattern generated by applications 102 generating read and write I/Os. It uses data to improve real application model and uses model to generate policy feedback to policy engine 111 running on one of the VM. Service Manager Engine 112 running on one of the VM uses output of the learning engine 111 and policy needed to be applied for a set of I/O. Security engine running on one of the VM 113 manages encryption keys and encryption policy and De-dupe engine does the Deduplication of block and file data. All the incoming I/Os to the cache are analyzed and correlated to cache resident data. The I/Os are cataloged and marked with different flags by policy, locality and direction depending upon whether they are to the disk for write or from the disk for read operation. For example, I/Os 118-121 are co-related and then decrypted to I/O 117 based on policy and service to be applied. Further, I/O 129 can be replicated by replication engine based on replication policy. Another set of co-related I/Os 122-129 and 114 are sent as input to learning engine 111. Service engine based on policy can also compress and encrypt the I/Os 115-116 on the fly based on policy.

Figure 2:
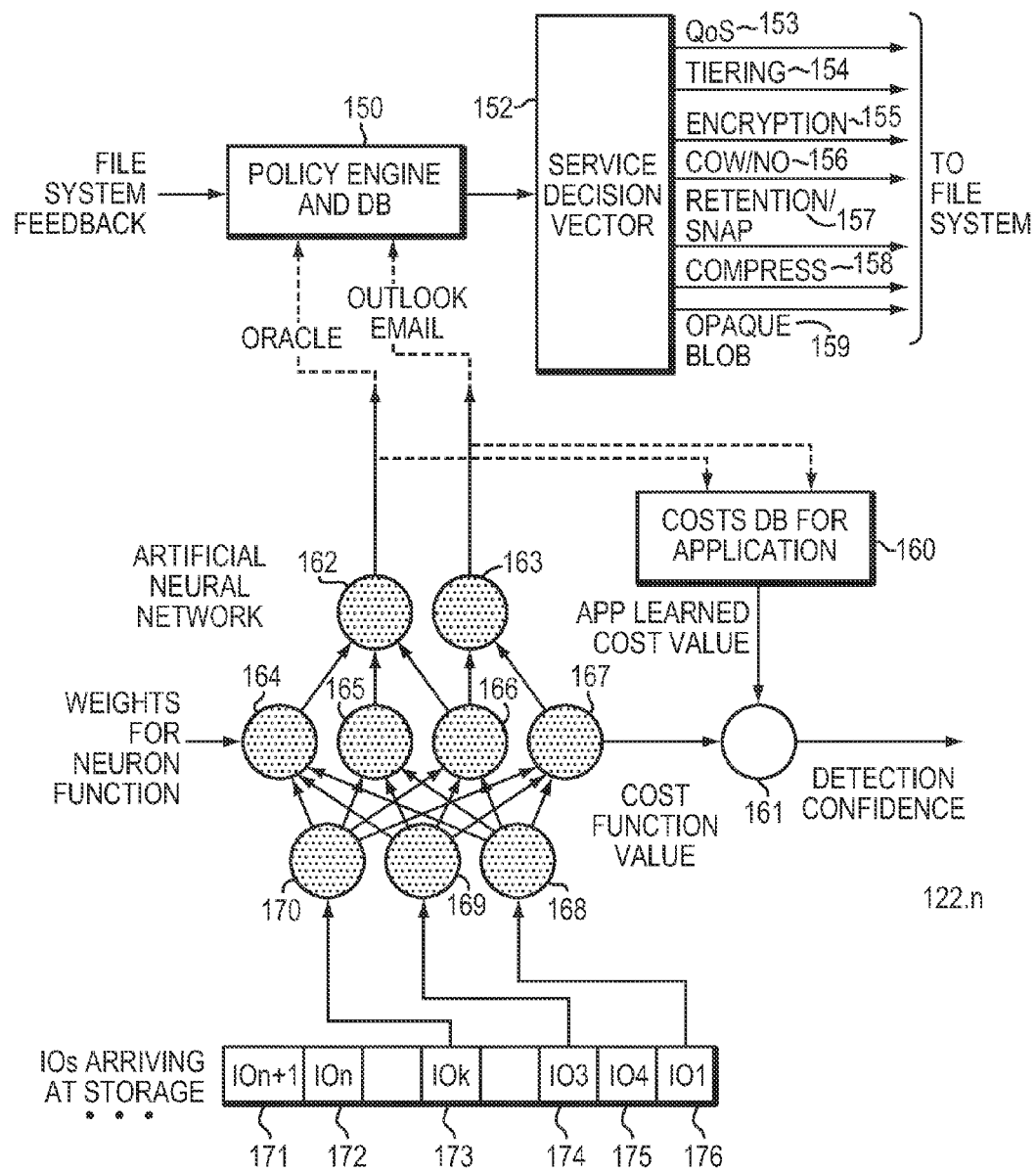
FIG. 2 is a block diagram of an intelligent storage system working in conjunction with policy engine and neural learning network in accordance with the present invention.

FIG. 2 shows an artificial neural network (ANN), usually called "neural network" (NN), is a mathematical model or computational model that tries to simulate the structure and/or functional aspects of biological neural networks. It is an adaptive system that changes its structure based on external or internal information that flows through the network during the learning phase. Modern neural networks are non-linear statistical data modeling tools. They are usually used to model complex relationships between inputs and outputs or to find patterns in data. The synapses of the neuron 162-170 are modeled as weights. The strength of the connection between an input and a neuron is noted by the value of the weight. The output of the neuron would therefore be the outcome of some activation function on the value of that output. For example, one function that can be used is that output being function of time between two I/Os, space on disk, number of I/Os and Policy used for those I/Os. Additionally cost for given application like oracle DB 160 is also used as input into the function to compute the resulting value. I/Os 171-176 arriving at storage are catalogued and indexed and then used as input to a supervised learning and modeling engine. The learning engine can be based on Neural networks, Fuzzy-logic modeling, Genetic based learning or any other kind available. The learning system is trained using real application I/O patterns and an application model is build from the training set. The output of the function from various neuron computations goes into detection confidence 161 to detect the error probability in the output values. Error in the computation is minimized by iterating over set of I/Os until the error reaches minimum threshold for the system.

A policy engine 150 uses the output of the application model to decide I/O placement, tier and characteristics, data protection and encryption strategy and various storage policies like RAID type, Erasure Coding, number of copies etc. Policy engine also receives feedback from File server implementing the file system. Catalog data is updated with the final I/O location and characteristics. I/Os are flushed to disk or served to hosts according to policy. Copy mirroring and replication services are spawned based on policies. Output of neural module would provide group of I/O on which operations need to be performed like de-duplication. For ex—Learning Machine indicates that set of 100 IOs belongs to oracle application and then policy of the machine will be consulted. I/Os are tagged and policy is searched for that particular tagged I/Os and interpreted. Then I/Os enter service decision vector 152 for decision regarding which storage tier will be targeted and what services 153-159 will be applied to it. Artificial intelligence neural network system trains the learning engine with different application by simply running for certain amount of time for those application to learn about the particular I/O load. It continually looks at certain set of I/O until there is enough data to create co-relations. Cataloging can be done on the storage disk or in cache (memory) and later flushed or it could be done on the fly. Read and write I/O have different requirements. The goal of the artificial storage system is to find hotspots and expand the storage when needed. For example, Oracle application is run on certain device, I/Os are cataloged and then fed to learning machine by providing as input set of n I/Os and the information on what kind of application was running. Service Decision Vector 152 implements various policies like Qos 153 which indicates a method of providing better service for selected traffic types over various types of storage devices and manages the path a given I/O takes based on how fast the throughout need to be. Each slice has QOS defined. Slices are expanded that contain QOS of the services like RAID 6. On which slice of storage disk, a block will be allocated, it will come from policy of the neural network system. Another service provided by policy is Compression 158 that compresses or un-compresses the given set of I/Os. Encryption Service 155 encrypts or decrypts the given set of I/Os. Retention and snap policy service 157 decides whether the I/O needs to be migrated to different tier later for faster response time, so makes replicas. Various applications are prioritized based on available storage resources. Customer typically would like the system to do its best it can based on available resources. Tiering decision is performed by Tiering service 154. For example, if SSD drive is filling up and request is from oracle, fiber channel would be used. There would be feedback from the learning system regarding what is policies are being implemented and what services are being performed. User can get additional storage resources based on feedback or change the policies. This feedback will go back to learning system as well to adapt. Additional services implemented are copy on first write 156 and opaque-blob data 159.

Further Operation Details

Reference will be made below to FIGS. 3-10 to describe a problem solved with the architecture described above with reference to FIGS. 1-2; however, a general overview is now given. The inventors have critically recognized that application users have to manage the various policies, need for various storage types for different application and need to implement in application layer various services and policies that effectively manage storage based on its cost and efficiency. Also, they need to understand and implement various data protection and disaster recovery policies. To implement various policies and services at application level introduces complexity and dependency on knowledge of how to effectively manage the storage.

This problem is addressed with the architecture of the present invention by implementing an application aware intelligent storage system that can accommodate any type of application workload transparently. It delivers the optimal performance to all the application concurrently by maximizing the value of all the storage resources by using machine learning to classify I/Os on the fly and place the data in best place. Policy engine reinforce policies associated to tiered storage and apply different services transparently using policy feedback. The present invention thus allows efficient management of storage, decreases the I/O requirement and at the same time improves the efficiency and latency of the applications in a data storage environment.

Figure 3:
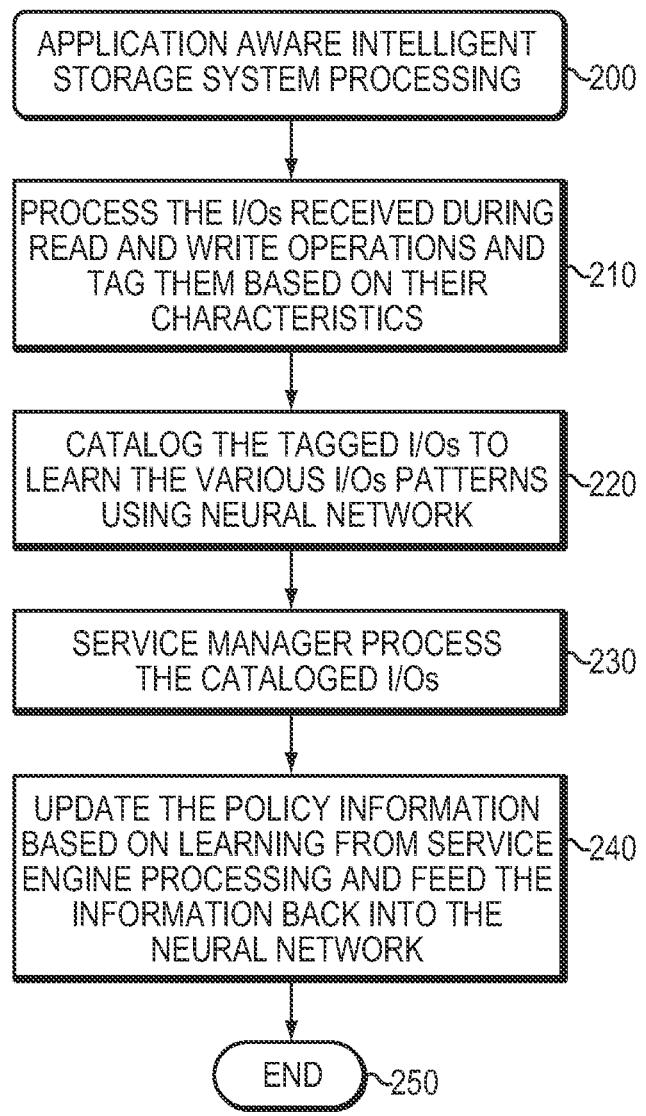
FIG. 3 is a flow chart showing a method by which an application aware intelligent storage system works in conjunction with policy engine and neural learning network.

FIG. 3 shows a flowchart of processing inside an application aware intelligent storage system starting at step 200. First at step 210, I/Os received by application for read and write operations are processed and tagged based on their characteristics. Then in step 220, I/Os are catalogued and tagged to learn JO patterns and behavior and then later match them with knowledge about the host applications. I/Os are grouped based on spatial and temporal locality criteria and then co-related. Learning model is used to learn behavior of applications based on specific workload associated with each application. The catalogued I/Os then are processed by Service Manager Engine in step 230. Service Manager based on feedback from the policy engine performs one or more services on set of I/Os by using four phased approach described in FIG. 4. After services are performed on the set of I/Os, the information about policy and service implemented on a given set of I/Os are fed back to neural information in step 240 to adapt and learn and processing ends at step 250.

Figure 4:
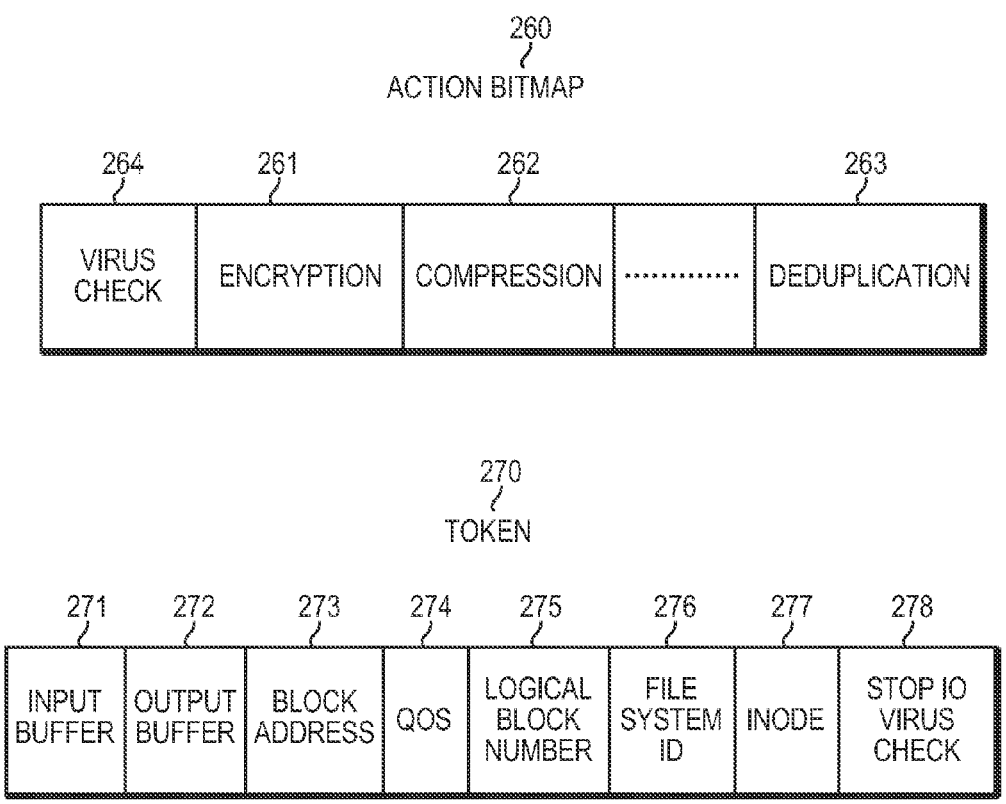
FIG. 4 is a block diagram of an action bitmap and token used by services manager engine within application aware intelligent storage system.

FIG. 4 shows a block diagram for objects Action Bitmap 260 and Token 270 that are used by Service Manager Engine in processing the I/Os. The Action Bitmap 260. includes various field that indicates the type of service that needs to be performed on set of I/Os. Each field, indicates not only the type of service but the bitmap as a whole indicates the order in which services need to be performed on the given set of I/Os. For example, the bitmap structure can include the following bits in order indicating at first place Virus check 264, Encryption 261, then Compression 262, and then de-duplication 263 at the end. The Token 270 includes various fields that help identify the data block on the storage device for reading or writing data from it. Field Input Buffer 271, indicates the buffer in which data that t is received from the application is placed. Field Output Buffer 272 is used to place the data from input buffer into it after services like compression is performed on input buffer. Field Block Address 273 points to address of the block where data is to be found for read operation. Field Qos 274 defines the quality of service and indicates where the slice of the storage needs to be allocated based on Qos policy. Field Logical Block Number 275 indicates logical mapping of the address of a block on the physical storage device. Field File system ID 276 indicates the file system on which a given data block resides. Field Inode 277 indicates the Inode of a file that includes the address of a given data block. Field Stop IO Virus Check 278 indicates whether IO need to be stopped at error should be returned back to the application.

Figure 5:
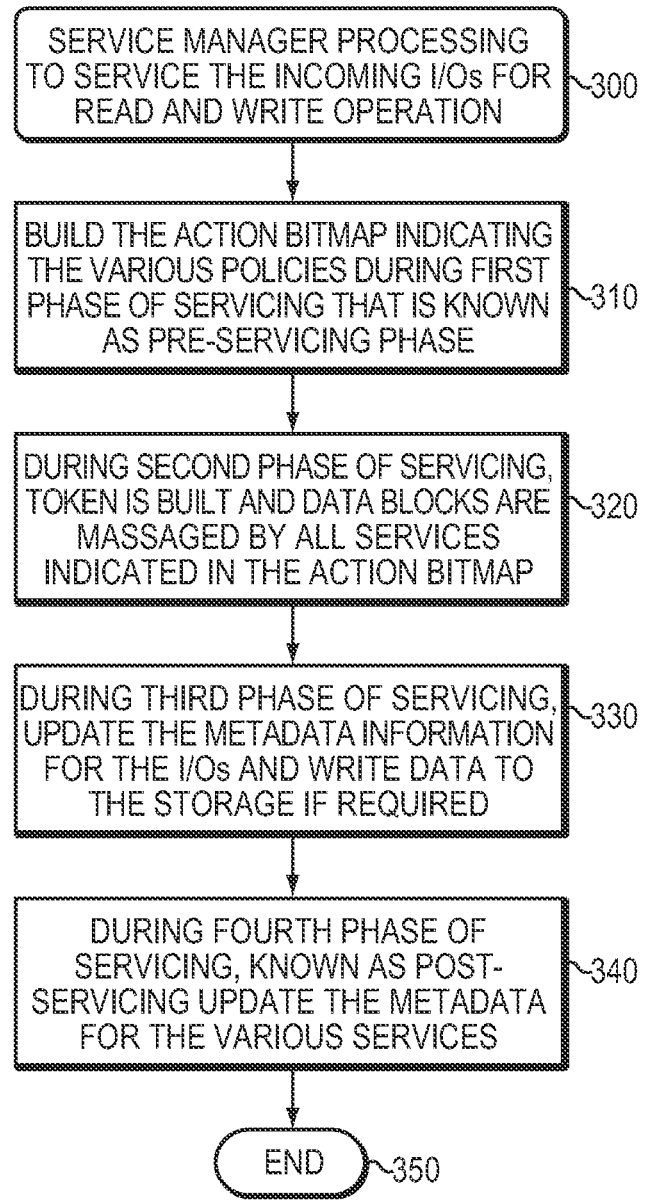
FIG. 5 is a flow chart showing a method by which four phased processing of service manager engine works within application aware intelligent storage system.

FIG. 5 is a flow chart showing a method by which four phased processing of service manager engine works within application aware intelligent storage system. The processing starts at step 300 when incoming I/Os are received by Service Manager for processing. In step 310, during the first phase called, pre-servicing phase, Action Bitmap structure is defined and allocated. This structure defines the order in which services will be allowed. In step 320, token structure is defined and allocated during second phase called, servicing phase. Also data blocks are massaged by all services that needed to be performed as indicated by Action Bitmap. During third phase of processing in step 330, I/Os are performed on the storage device and metadata is updated with the information from I/Os. Data is written to the storage if required. In step 340, last phase of the processing is performed, called post servicing, where metadata of various services are updated and services are notified.

Figure 6:
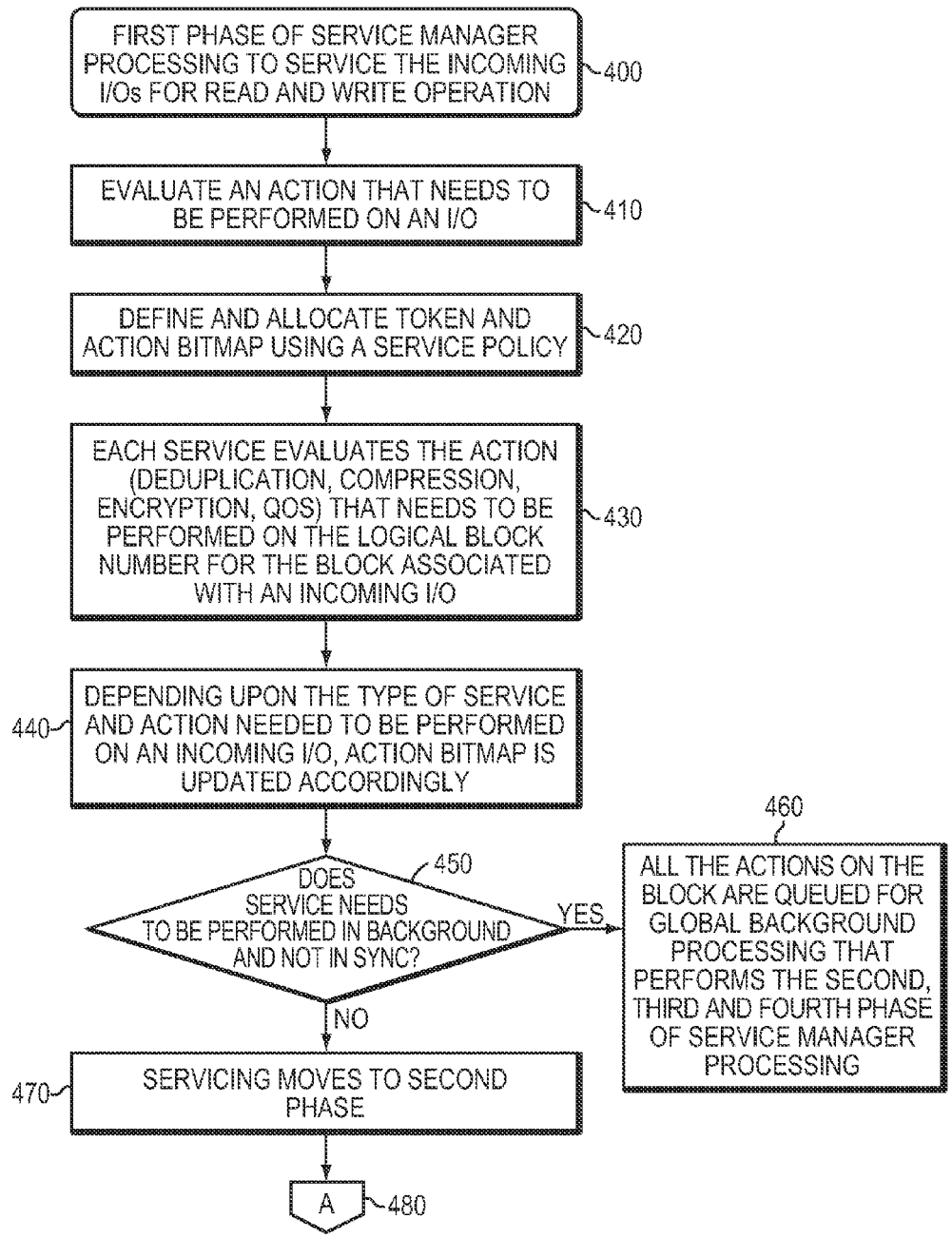
FIG. 6 is a flow chart showing a method by which first phase processing of service manager engine works within application aware intelligent storage system.

FIG. 6 is a flow chart showing a method by which first phase processing of service manager engine works within application aware intelligent storage system. First phase processing starts at step 400 and then in step 410, action bitmap structure is evaluated to assess the various actions that need to be performed on a set of I/Os. Policy engine is consulted and based on service policy, token and action bitmap is defined and allocated in step 420. Each service then evaluates the action in step 430 from action bitmap that needs to be performed on the logical block number for the data block associated with an incoming I/O request. Each service evaluates if logical block number is provided and will set the action bitmap accordingly. For example, for de-duplication and compression service offset of the logical block number is selected. Qos is determined for use for a given logical block number stored in the token. Thus, in step 440, based on type of service and action needed to be performed on an incoming I/O, action bit map is updated accordingly. In next step 450, service manager checks whether a given service like de-duplication, compression, encryption etc needs to be performed in background or in sync with rest of the service processing of an I/O. If the action needs to be performed in sync, then service processing moves to next phase in step 470. If the action needs to be performed in background, then in step 460, all the actions on the block are queued for global background processing that performs rest of the three phases of service manager processing in the background.

Figure 7:
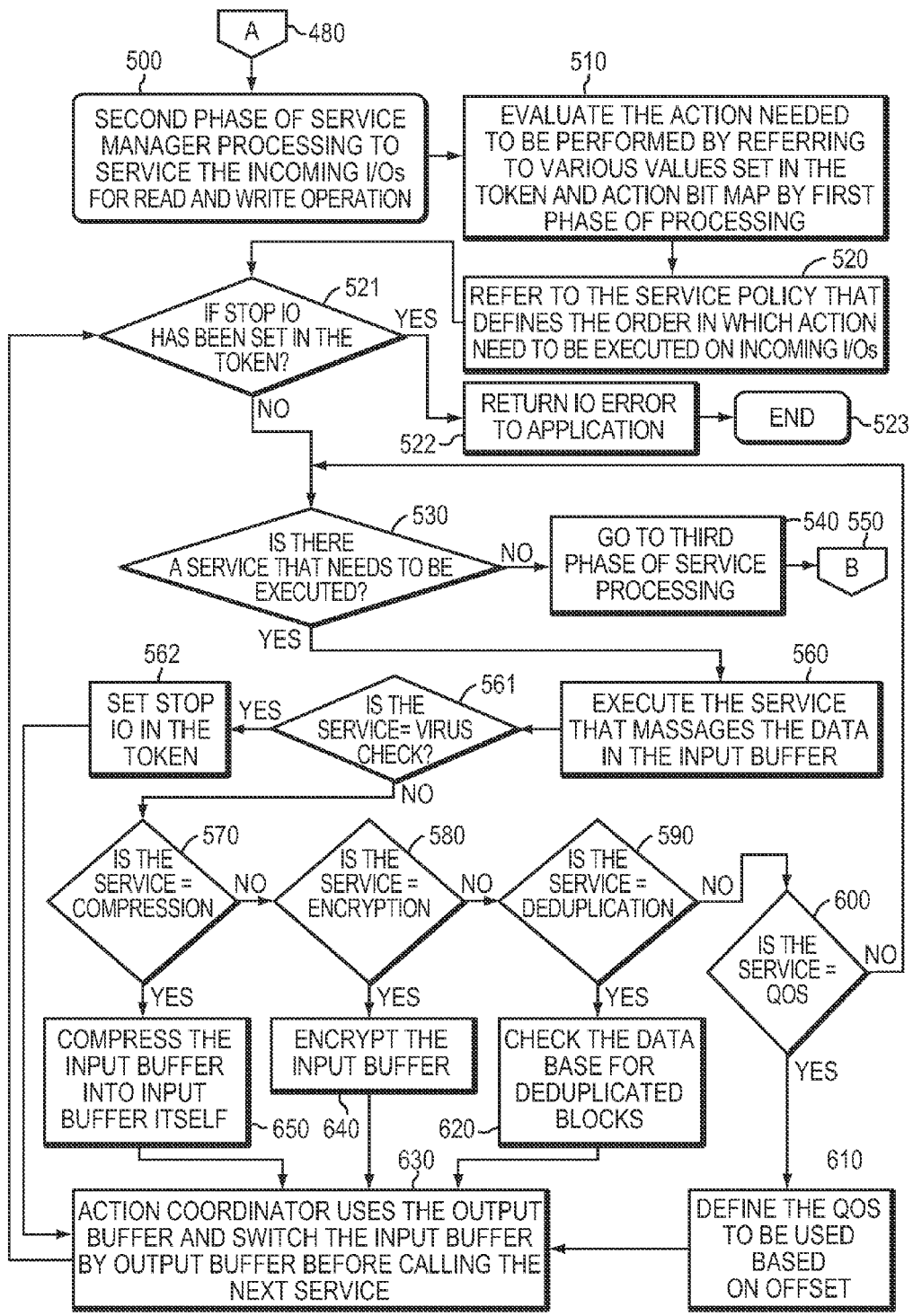
FIG. 7 is a flow chart showing a method by which second phase processing of service manager engine works within application aware intelligent storage system.

FIG. 7 is a flow chart showing a method by which second phase processing of service manager engine works within application aware intelligent storage system. After completing the first phase of processing in step 480, second phase of service processing starts at step 500. In step 510, actions that are needed to be performed are evaluated by action co-coordinator. It refers to various values set in the token and action bit map by first phase of the processing. Next in step 520, service policy is referred that defines the order in which action need to be executed on incoming I/Os. Processing then starts for each service by executing the associated action with that service. In step 521, a check is made whether stop IO has been set in the token. If the value of stop IO has been set, IO error is returned to the application in step 522 and processing aborts in step 523. If stop IO has not been set, then in step 530, a check is made whether there is any service that needs to be executed. If there is a service as indicated by action bit map, then in step 560, service manager executes that service that massages the data placed in the input buffer. For example, de-duplication service will look in de-duplication data base for the digest information and also look for using a block with same characteristics (compressed, encrypted, same Qos etc.). Next the type of service is checked so that appropriate action can be taken based on kind of service performed. If the service is to perform virus check on a data block in step 561, then in step 562, value of stop JO is set in the token. If the service is to perform compression on a data block in step 570, then in step 650, input buffer is compressed and placed in input buffer itself. If the service is to perform encryption on a data block in step 580, then in step 640, input buffer is encrypted. If the service is to perform de-duplication on a data block in step 590, then in step 620, database is checked for de-duplicated blocks. If the service is to perform Qos on a data block in step 600, then in step 610, Qos to be used is defined based on offset into the file. Once various actions are performed, in step 630, action coordinator uses the output buffer field of token and switches the input buffer by output buffer before calling the next service. The processing goes back at step 530 to perform the next service defined in the action bitmap. If there is no more service to be performed, processing then moves onto third phase at step 540.

Figure 8:
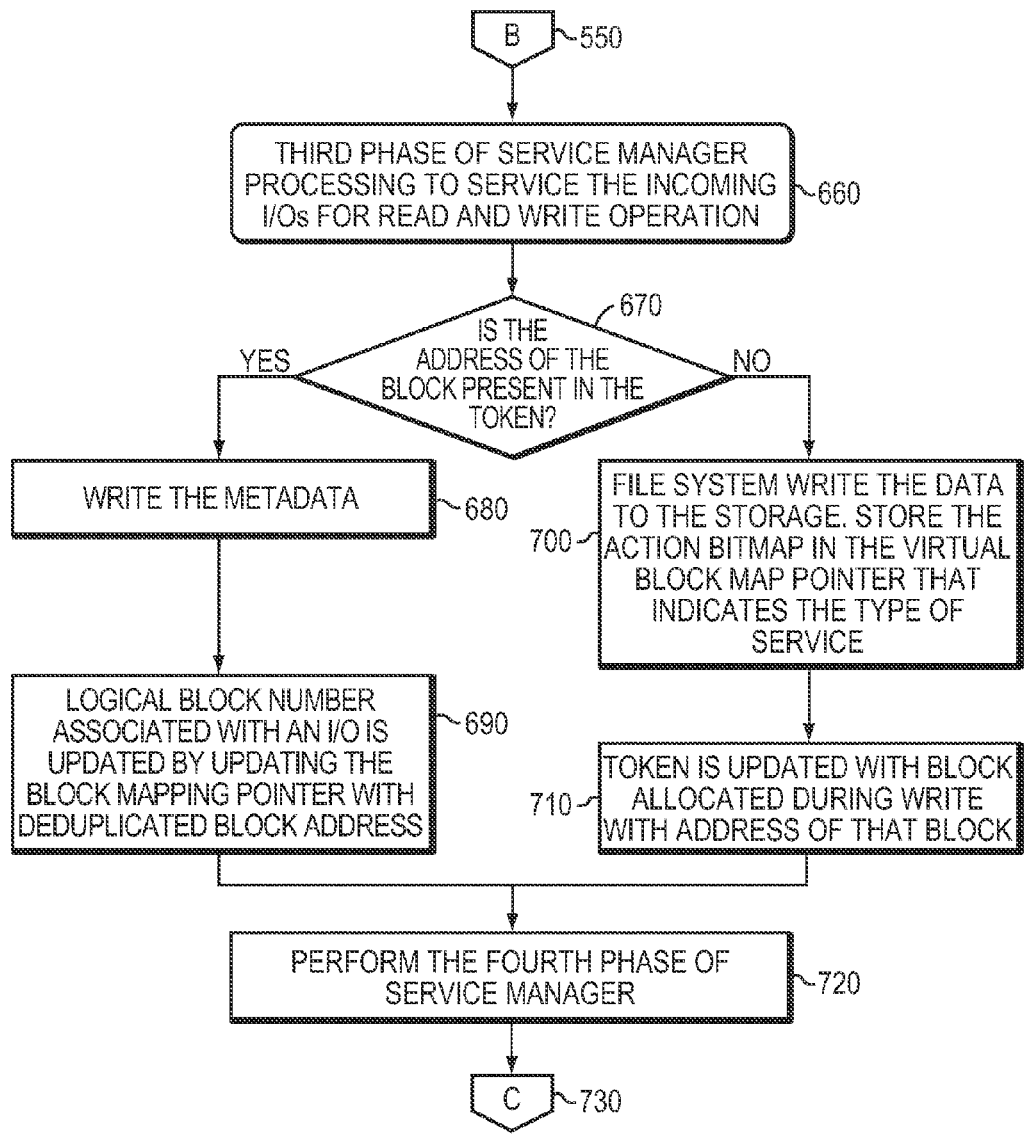
FIG. 8 is a flow chart showing a method by which third phase processing of service manager engine works within application aware intelligent storage system.

FIG. 8 is a flow chart showing a method by which third phase processing of service manager engine works within application aware intelligent storage system. After completing the second phase of processing in step 550, third phase of service processing starts at step 660. Check is made in step 670 if the address of the block is present in the token. If yes, then in step 680, only metadata is updated by updating the mapping of the file with address of the block for the associated logical block number and updating the virtual block mapping pointer to indicate the de-duplicated block in step 690. If the address of the block is not present in the token, then in step 700, file system write the data to the storage. It stores the action bitmap in the virtual block mapping pointer that indicates the type of service. Then in step 710, token is updated with block allocated during write with address of that block. Processing then proceeds to step 720 where last and fourth phase of servicing processing starts.

Figure 9:
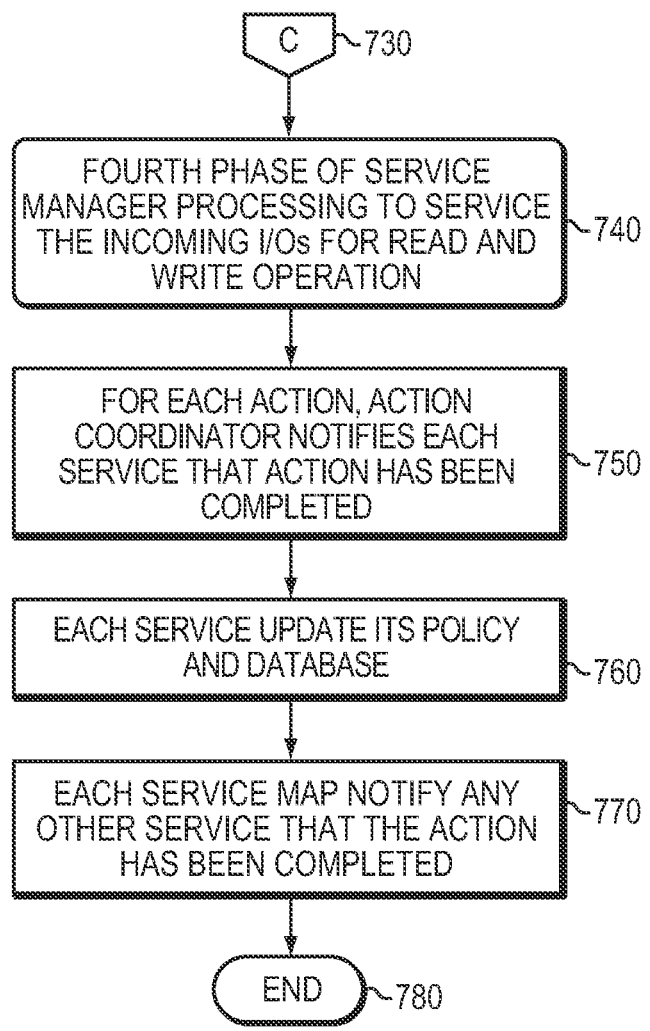
FIG. 9 is a flow chart showing a method by which fourth phase processing of service manager engine works within application aware intelligent storage system.

FIG. 9 is a flow chart showing a method by which fourth phase processing of service manager engine works within application aware intelligent storage system. After completing the third phase of processing in step 730, fourth phase of service processing starts at step 740. In step 750, for each action, action coordinator notifies each service that action has been completed. In step 760, each service then updates its policy and database. In step 770, each service map notifies any other service that the action has been completed. The servicing processing then ends at step 780.

Figure 10:
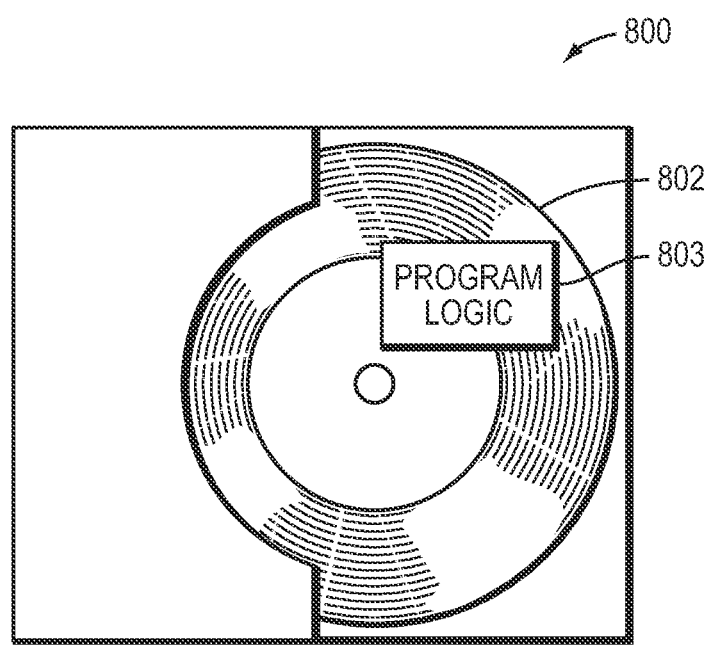
FIG. 10 shows a storage application for carrying out the methodology described herein and a computer medium including software described herein.

FIG. 10 shows the storage application 600 and Computer-readable medium 602 that includes program logic 603. Such a medium may be represented by any or all of those described at the beginning of this Detailed Description.

What is claimed is:

1. A method of operating a storage server in a data network for read or write access to data of a file, the file including multiple data blocks containing data of the file, and the file further being organized as a hierarchy of file system blocks including inodes, indirect blocks, and data blocks, the file stored in a data storage including a production file having a first data block in the hierarchy of file system blocks, the first data block being a child of the production file inode in the hierarchy of file system blocks, the method comprising the steps of:

tagging one or more I/Os received from an application for read or write access to data of a file, wherein the tagging of one or more I/O is done based on the application sending the I/O request to the storage server and characteristics of the I/O;

cataloging one or more tagged I/Os to create one or more co-related I/O patterns using a neural network, wherein the neural network uses the one or more tagged I/Os to create one or more I/O pattern;

processing one or more I/Os by performing one or more services executed by a service manager, wherein the service manager executes one or more services communicated by a policy engine wherein the policy engine manages the services that are needed to be performed on one or more tagged I/Os; and updating the policy engine with the results of processing one or more I/Os by the service manager; wherein the processing of one or more I/Os by performing one or more services executed by the service manager comprises the steps of:

executing a first phase, wherein the first phase processing builds an action bitmap wherein the action bitmap indicates one or more services to be executed;

executing a second phase, wherein the second phase processing builds a token and massages the data block of the file using the token by executing one or more services indicated in the action bitmap;

executing a third phase, wherein the third phase processing updates metadata for one or more I/Os and if required, writes data on the data storage; and executing a fourth phase, wherein the fourth phase processing updates the metadata of one or more services executed by the third phase.

2. The method of claim 1, wherein the storage server is represented by a file server, wherein the file server presents a logical view of a file to an application running on a client of the file server, wherein the data of the file can be compressed, encrypted or deduplicated.

3. The method of claim 1, wherein the action bitmap includes one or more bits indicating one or more services to be executed on one or more I/Os sent by the application running on a client of the file server.

4. The method of claim 1, wherein the token includes an input buffer wherein the input buffer indicates the buffer in which data received from the application is stored.

5. The method of claim 1, wherein the token includes an output buffer wherein the output buffer indicates the buffer in which data from the input buffer is stored after executing one or more services on the input buffer.

6. The method of claim 1, wherein the token includes a block address wherein the block address points to address of the data block of a file that stores the data for the I/O.

7. The method of claim 1, wherein the token includes a Qos wherein the Qos indicates the type of data storage that needs to be allocated.

8. The method of claim 1, wherein the token includes a logical block number wherein the logical block number indicates the logical mapping of the address of a data block on the data storage.

9. The method of claim 1, wherein the token includes a stop IO virus check field wherein the stop IO virus check field indicates whether IO processing needs to be stopped.

10. The method of claim 1, wherein the first phase processing of one or more I/Os further comprises the steps of:

evaluating a service to be executed on one or more I/Os wherein the service is indicated by the policy engine;

defining and allocating the action bitmap indicating one or more services to be executed on one or more I/Os;

evaluating and updating one or more actions in the action bitmap to be executed on the data block associated with the one or more I/Os;

checking whether one or more services to be executed on one or more I/Os is to be executed in the background and upon finding that the service need to be executed in the background, queuing one or more actions to be performed by a background process wherein the background process executes second, third and fourth phase of processing the I/Os concurrently with servicing of rest of the I/Os.

11. The method of claim 1, wherein the second phase processing of one or more I/Os further comprises the steps of:

evaluating one or more actions to be performed on one or more I/Os;

checking the type of service to be executed on one or more I/Os and upon determining the type of service, performing the action on the input buffer of the token; and updating the output buffer with the result of execution of the action on the input buffer of the token.

12. The method of claim 1, wherein the third phase processing of one or more I/Os further comprises the steps of:

checking whether the address of the data block is present in the token and upon determining that the address of the data block is present in the token, updating the metadata of the logical block number associated with one or more I/O; and upon finding that the address of the data block is not present in the token, writing the data to the data storage and updating the token with address of the data block.

13. The method of claim 1, wherein the fourth phase processing of one or more I/Os further comprises the steps of:

notifying each service that one or more action has been completed; and updating the policy engine that the action has been completed.

14. A system for accessing a data of a file in a data storage environment, the system comprising:

a data storage storing files, wherein the files stored on the data storage includes a production file having a first data block in the hierarchy of file system blocks, the first data block being a child of the production file inode in the hierarchy of file system blocks;

a storage server, wherein the storage server access the files stored on the data storage, wherein the file includes multiple data blocks containing data of the file, and the file further being organized as a hierarchy of file system blocks including inodes, indirect blocks, and data blocks; and a program logic in communication with the data storage and the storage server for carrying out the steps of:

tagging one or more I/Os received from an application for read or write access to data of a file, wherein the tagging of one or more I/O is done based on the application sending the I/O request to the storage server and characteristics of the I/O;

cataloging one or more tagged I/Os to create one or more co-related I/O patterns using a neural network, wherein the neural network uses the one or more tagged I/Os to create one or more I/O pattern;

processing one or more I/Os by performing one or more services executed by a service manager, wherein the service manager executes one or more services communicated by a policy engine wherein the policy engine manages the services that are needed to be performed on one or more tagged I/Os; and updating the policy engine with the results of processing one or more I/Os by the service manager; wherein the processing of one or more I/Os by performing one or more services executed by the service manager comprises the steps of:

executing a first phase, wherein the first phase processing builds an action bitmap wherein the action bitmap indicates one or more services to be executed;

executing a second phase, wherein the second phase processing builds a token and massages the data block of the file using the token by executing one or more services indicated in the action bitmap;

executing a third phase, wherein the third phase processing updates metadata for one or more I/Os and if required, writes data on the data storage; and executing a fourth phase, wherein the fourth phase processing updates the metadata of one or more services executed by the third phase.

15. The system of claim 14, wherein the storage server is represented by a file server, wherein the file server presents a logical view of a file to an application running on a client of the file server, wherein the data of the file can be compressed, encrypted or deduplicated.

16. The system of claim 14, wherein the action bitmap includes one or more bits indicating one or more services to be executed on one or more I/Os sent by the application running on a client of the file server.

17. The system of claim 14, wherein the token includes an input buffer and an output buffer wherein the input buffer indicates the buffer in which data received from the application is stored and the output buffer indicates the buffer in which data from the input buffer is stored after executing one or more services on the input buffer.

18. The system of claim 14, wherein the token further includes a block address, a logical block number, a Qos and a stop IO virus check wherein the block address points to address of the data block of a file that stores the data for the I/O and the logical block number indicates the logical mapping of the address of a data block on the data storage and the Qos indicates the type of data storage that needs to be allocated and a stop IO virus check indicates whether IO processing needs to be stopped.

19. The system of claim 14, wherein the first phase processing of one or more I/Os further comprises the steps of:

evaluating a service to be executed on one or more I/Os wherein the service is indicated by the policy engine;

defining and allocating the action bitmap indicating one or more services to be executed on one or more I/Os;

evaluating and updating one or more actions in the action bitmap to be executed on the data block associated with the one or more I/Os;

checking whether one or more services to be executed on one or more I/Os is to be executed in the background and upon finding that the service need to be executed in the background, queuing one or more actions to be performed by a background process wherein the background process executes second, third and fourth phase of processing the I/Os concurrently with servicing of rest of the I/Os.

20. The system of claim 14, wherein the second phase processing of one or more I/Os further comprises the steps of:

evaluating one or more actions to be performed on one or more I/Os;

checking the type of service to be executed on one or more I/Os and upon determining the type of service, performing the action on the input buffer of the token; and updating the output buffer with the result of execution of the action on the input buffer of the token.

21. The system of claim 14, wherein the third phase processing of one or more I/Os further comprises the steps of:

checking whether the address of the data block is present in the token and upon determining that the address of the data block is present in the token, updating the metadata of the logical block number associated with one or more I/O; and upon finding that the address of the data block is not present in the token, writing the data to the data storage and updating the token with address of the data block.

22. The system of claim 14, wherein the fourth phase processing of one or more I/Os further comprises the steps of:

notifying each service that one or more action has been completed; and updating the policy engine that the action has been completed.

23. A program product for accessing data of a file, the program product operating in a data storage environment that includes a data storage system in communication with a storage server providing logical disk storage to the storage server for storing files that includes multiple data blocks containing data of the files, and the file further being organized as a hierarchy of file system blocks including inodes, indirect blocks, and data blocks, wherein the program product includes computer-executable logic encoded on a computer-readable medium for executing the following steps:

tagging one or more I/Os received from an application for read or write access to data of a file, wherein the tagging of one or more I/O is done based on the application sending the I/O request to the storage server and characteristics of the I/O;

cataloging one or more tagged I/Os to create one or more co-related I/O patterns using a neural network, wherein the neural network uses the one or more tagged I/Os to create one or more I/O pattern;

processing one or more I/Os by performing one or more services executed by a service manager, wherein the service manager executes one or more services communicated by a policy engine wherein the policy engine manages the services that are needed to be performed on one or more tagged I/Os; and updating the policy engine with the results of processing one or more I/Os by the service manager; wherein the processing of one or more I/Os by performing one or more services executed by the service manager comprises the steps of:
  executing a first phase, wherein the first phase processing builds an action bitmap wherein the action bitmap indicates one or more services to be executed;
  executing a second phase, wherein the second phase processing builds a token and massages the data block of the file using the token by executing one or more services indicated in the action bitmap;
  executing a third phase, wherein the third phase processing updates metadata for one or more I/Os and if required, writes data on the data storage; and
  executing a fourth phase, wherein the fourth phase processing updates the metadata of one or more services executed by the third phase.

* * * * *